United States Patent [19]

Dean

[11] 4,355,791
[45] Oct. 26, 1982

[54] SNUBBER ASSEMBLY
[75] Inventor: Arthur R. Dean, San Diego, Calif.
[73] Assignee: The United States of America as represented by the Secretary of the Navy, Washington, D.C.
[21] Appl. No.: 211,981
[22] Filed: Dec. 1, 1980
[51] Int. Cl.³ .............................................. F16F 7/00
[52] U.S. Cl. ................................... 267/136; 206/591; 267/161
[58] Field of Search .............................. 188/380, 382; 267/134–136, 139, 140.2–140.5, 160, 161, 164; 206/591

[56] References Cited

U.S. PATENT DOCUMENTS

| | | | |
|---|---|---|---|
| 2,393,297 | 1/1946 | Dath | 267/1 |
| 2,828,934 | 2/1955 | Markowski | 248/358 |
| 2,867,434 | 1/1959 | Johnson | 267/140.4 X |
| 2,896,937 | 7/1959 | Miller | 267/1 |
| 3,037,734 | 6/1962 | Coyle | 248/358 |
| 3,113,755 | 12/1963 | Stevens et al. | 248/358 |
| 3,198,506 | 8/1965 | Thorn | 267/1 |
| 3,635,332 | 1/1972 | Ross | 206/591 |

Primary Examiner—Duane A. Reger
Attorney, Agent, or Firm—Robert F. Beers; Ervin F. Johnston; Thomas Glenn Keough

[57] ABSTRACT

Electronic modules are protected from damage which might be caused by ambient vibrations and shock. Openings in the cabinet are sized to accommodate the electronic modules and snubbers are interposed between the modules and the walls of the cabinets to hold them securely in place. A pair of Belleville springs in each snubber force a projecting portion of a piston against the module or a flat strap that serves to distribute the snubbing force over a wider area on the module.

10 Claims, 5 Drawing Figures

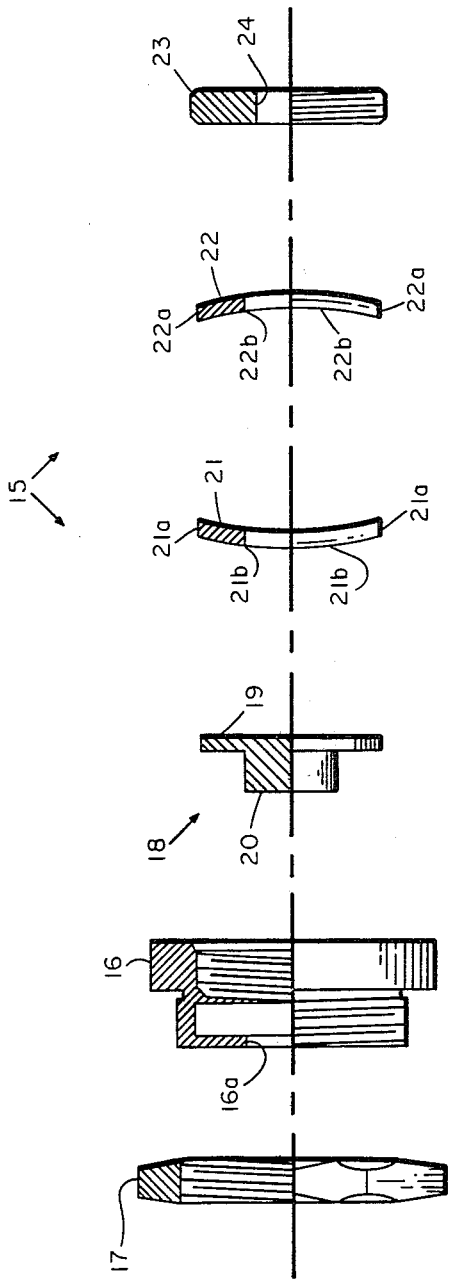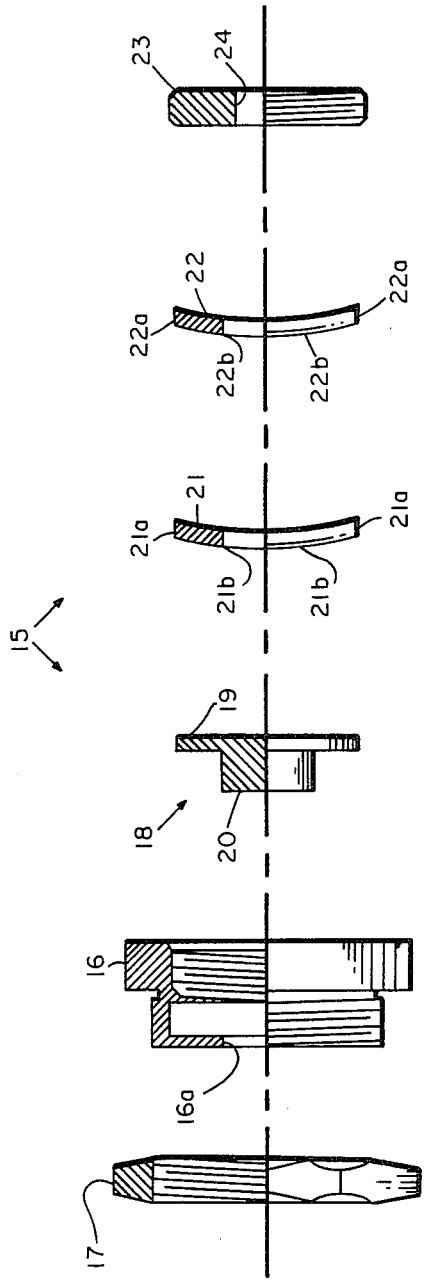

SNUBBER ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Over the years progress has been made in the standardization of equipments and their supporting hardware. Cost reduction, lower inventories, simplification of structures, ease of repair, to name a few, are the natural outgrowths of the standardization process. Electronics users and manufacturers especially have benefited by this growing trend.

Due to the inherently delicate natures of most electronics equipments, preferably they are contained in heavy duty protective cabinets. The cabinets are dimensioned to occupy commonly definable spaces and have openings for shelves that hold multifunction electronic packages.

Because of higher and higher levels of sophistication coupled with lower per unit production costs, technology has nurtured the evolution of prepackaged electronic modules each of which performs some discrete electronic function. Now, after routinely checking the few parameters for each module, a technician discards and replaces an inoperable module with a new one by merely inserting the new one in a cabinet opening and making a few elementary connections.

The trouble shooting and replacement of modules in standardized cabinets is not without its problems, however. Minor size variations, possibly caused by different manufacturing and packaging techniques, makes some modules larger or smaller than others. Consequently, when the cabinets containing the modules are subjected to shocks, vibrations, and system resonances, a smaller module, loosely held, may well have a reduced mean time between failure. One obvious way to increase the period of reliable operation is to make a number of shims or inserts or to otherwise modify each cabinet to secure differently configured modules. Unfortunately, this approach requires an increased inventory of parts, as well as requiring that personnel be adequately trained to recognize and to correct such conditions.

Thus, there is a continuing need in the state-of-the-art for a means for making otherwise standardized electronic-module cabinets able to accommodate differently dimensioned electronic modules so that their expected life cycles can be realized. An adjustable means which does not damage or otherwise compromise the integrity of the modules is needed which will exert suitable snubbing forces as the situation demands.

SUMMARY OF THE INVENTION

The present invention is directed to providing an apparatus for snubbing a module fitted in the opening of a cabinet. A cylindrically-shaped fitting is sized to fit through a hole in the wall of the cabinet and is provided with a coaxial aperture for receiving a projection from a disk-shaped piston. A pair of Belleville springs resiliently urge the projection through the coaxial aperture and a closure disk is selectively advanceable within the cylindrically-shaped fitting to modify the degree of extension and the magnitude of the exerted snubbing force. A flat strap optionally is disposed between the piston projection and the wall of the electronics module to move equally distribute the snubbing force and to reduce the possibility of inadvertently damaging the module.

It is the prime object of the invention to provide a means for securing electronic modules in a cabinet.

Another object of the invention is to provide a means for snubbing slightly differentially sized modules in standardized openings to avoid premature failure of the modules.

Yet another object of the invention is to provide a snubber assembly for holding modules in a standardized cabinet that is readily adjustable in degree of extension and magnitude of snubbing force.

Still another object is to provide a snubber which has the capability for distributing the snubbing force over a larger area to avoid damage to the snubbed modules.

A further object of the invention is to provide an adjustable snubber assembly employing a pair of Belleville springs.

Yet a further object is to provide a snubber assembly including a pair of nested Belleville springs for exerting an increased snubbing force.

Still another object is to provide a snubber assembly having a pair of serially-arranged Belleville springs to accommodate differently sized modules.

These and other objects, advantages and novel features of the invention will become apparent from the following detailed description of the invention when considered in conjunction with the accompanying drawings.

BRIEF DESCRIPTION OF THE DRAWINGS

FIG. 4 is a cross-sectional exploded view of the snubber.

FIG. 5 is a cross-sectional exploded view of a modification of the snubber.

DESCRIPTION OF THE PREFERRED EMBODIMENT

Figure 1:
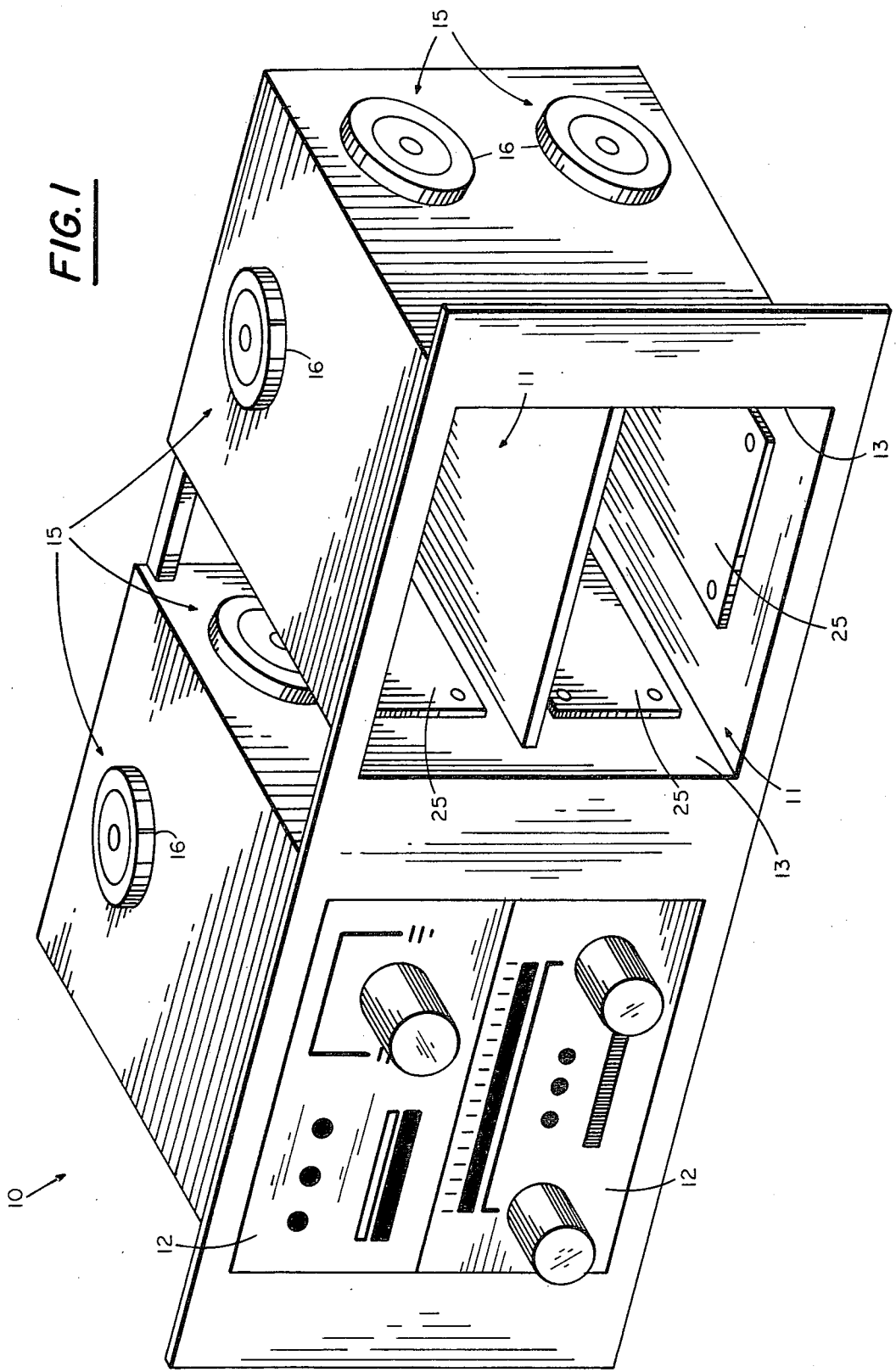
FIG. 1 is an isometric view of modules being held in a cabinet by a number of snubber biased straps.

Referring now to the drawings and in partiular to FIG. 1, a standardized cabinet 10 is provided with a number of openings 11 for receiving electronics modules 12. The cabinets are substantially built to withstand the rigors of handling, shocks, vibrations and system resonances and usually are provided with insulation and a temperature control system for further assuring reliable operation of the modules. Over the years, customers have insisted on standardized specifications to enable more efficient servicing, simplified training procedures, and overall reduction in costs. Thus, the standardized cabinets have evolved for receiving a number of standard-size electronic modules.

Figure 2:
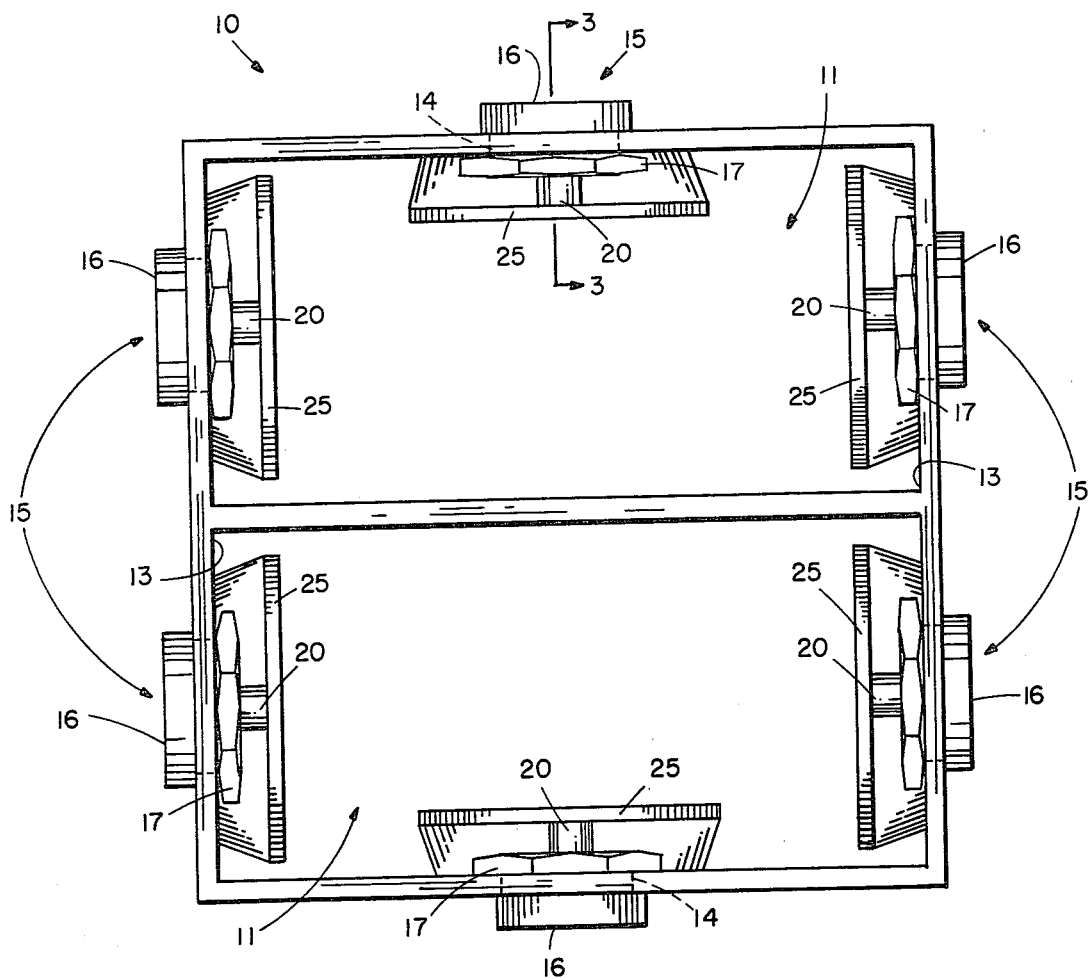
FIG. 2 is a rear view depicting the mechanical coaction between the snubbers and the straps.

FIG. 2 depicts a rear view of a portion of the electronics module cabinet of FIG. 1 in which several standardized openings 11 are provided to accommodate electronics modules. In the walls 13 of the cabinet a number of holes 14 have been bored for each receiving a snubber assembly 15.

Figure 3:
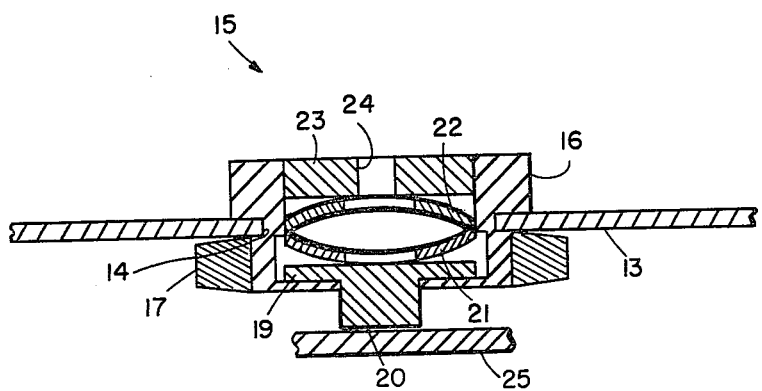
FIG. 3 is a cross-sectional representation taken generally along lines 3—3 in FIG. 2.

Noting FIGS. 3 and 4, each snubber assembly is machined from a rigid material, such as brass or the strong synthetics, which does not overly react with the surroundings, and has an essentially cylindrically-shaped housing fitting 16 that is sized to fit through holes 14 in the walls.

A lock nut 17 is threaded onto correspondingly shaped threads on the outside of the housing to secure it in the wall. A piston member 18 has a ring-shaped base portion 19 and an integral projection 20 sized to permit free reciprocal travel within the interior of the cylindrically-shaped housing. As the ring-shaped portion approaches the apertured wall of the housing, projection 20 extends through coaxial aperture 16a.

A pair of Belleville washers 21 and 22, annular frustro-conical metal rings, are located next to the ring-shaped portion of the piston within the cylindrically-shaped housing in such a manner that the outer ends 21a and 22a of the washers engage the inner wall of the housing in an abutting relationship with each other while the inner end 21b of washer 21 abuts the disk-shaped base portion of the piston member while the inner end 22b of the other washer 22 bears against a threaded closure disk 23.

The disk has its outer circumference machined with a thread that cooperates with the correspondingly located mating threads provided in the inner surface of the cylindrically-shaped housing. When the disk is screwed into the housing using an Allen-like wrench that engages a socket recess 24, the Belleville springs are slid against the ring-shaped portion of the piston so that the projection 20 extends through the coaxial aperture from the face of the cylindrically-shaped housing. Both the degree of extension of the piston as well as the snubbing force exerted by the piston may be adjusted by suitably adjusting the closure disk.

In order not to belabor what is readily known in the art regarding the characteristics of Belleville springs, attention is directed to Vol. 2, Chapt. 13.3 H "Belleville Springs and Flat Disk Springs," *Handbook of the Engineering Sciences,* by Potter, D. Van Nostrand Co., Inc. 1967. This article apprises regarding spring constants, magnitudes of force exerted, etc. which may be selected by one skilled in the art to perform as desired. Another reliable reference source is MIL-STD-29, Appendix.

Referring once again back to FIG. 2, several snubber assemblies are disposed in an orthogonally disposed relationship around an opening to hold an electronics module securely within the cabinet opening. The projections 20 of the four snubber assemblies 15 project inwardly in the opening to engage the module. Experience has demonstrated, however, that the modules may in fact themselves be damaged by the concentrated snubbing force exerted by the projection of each snubber assembly.

A flat plate or strap 25 is located near the inner surface of each wall and is fixed thereto by a number of screws, rivets, or other suitable fastening means. These flat plates or straps are interposed between the snubber assemblies' projections and the electronic modules. They serve to distribute more evenly the snubbing force exerted by the snubber assemblies to reduce the possibility of inadvertently damaging the electronic modules. Thus, the snubber assemblies which were intended to allow full utilization of a module's intended capability cannot inadvertently damage the module and decrease the mean time between failures.

The flat plates or straps are located so that defective modules may be easily withdrawn from the openings and the new ones easily replaced. Should a certain environmental application require that more or less force be exerted to securely and safely hold the modules without crushing them, a technician merely needs to insert the appropriately-sized Allen wrench or socket drive in socket 24 and appropriately loosen or tighten it.

What has been designed is a novel snubber assembly which allows the secure holding of standard electronics module packages in a protective cabinet. The snubber assembly has the capability for accommodating tolerance mismatches among differently sized packages. By varying the spring constants on the Belleville washers, extending the length of the projection 20, the depth of the cylindrically-shaped housing 16, etc., size discrepancies which might develop according to a manufacturer's tolerances, manufacturing techniques, etc. can be securely accommodated in a cabinet without compromising the built-in reliability of the module's packages. The modules themselves need not be modified mechanically to make them fit within the cabinets.

A modification of the embodiment set forth employs the Belleville springs in a nesting relationship, see FIG. 5. The snubbing force in this case is the additive force exerted by one spring, in this case, twice as much as a single spring. Thus, a single snubber can be made to alter its snubbing force as a situation demands and as the rigidity of the module packages is changed.

Obviously many modifications and variations of the present invention are possible in the light of the above teachings. It is therefore to be understood that within the scope of the appended claims the invention may be practiced otherwise than as specifically described.

What is claimed is:

1. An apparatus for snubbing a module fitted in the opening of a cabinet comprising:
   means mounted in a wall of the cabinet in communication with the opening for providing a housing having a coaxial aperture therein;
   means sized to be reciprocally carried in the housing providing means for extending through the coaxial aperture into the opening against the module;
   means disposed adjacent the extending means for exerting a snubbing force on the module;
   means abutting the exerting means and having a surface mechanically cooperating with the exerting means for selectively fixing the degree of extension of the extending means and magnitude of the snubbing force by the exerting means against the module; and
   means interposed between the exerting means and the module for distributing the snubbing force thereon.

2. An apparatus according to claim 1 in which the force distributing means is a flat strap mounted on the wall of the cabinet within the opening.

3. An apparatus according to claim 1 in which the housing providing means is a cylindrically-shaped fitting sized to reach through a hole provided in the cabinet wall and a lock nut is threaded to mate with a correspondingly configured surface on the fitting to secure it in the hole.

4. An apparatus according to claim 3 in which the extending means is a piston having a disk-shaped portion carried in the fitting and a projection reaching through the coaxial aperture.

5. An apparatus according to claim 5 in which the exerting means is a pair of Belleville springs carried inside the cylindrically-shaped fitting.

6. An apparatus for snubbing a module fitted in the opening of a cabinet comprising:

a cylindrically-shaped fitting sized to reach through a hole provided in the cabinet wall and a lock nut is threaded to mate with a correspondingly configured surface on the fitting to secure it in the hole to be in communication with the opening for providing a housing having a coaxial aperture therein;

a piston having a disk-shaped portion sized to be reciprocally carried in the cylindrically-shaped fitting and further having a projection for extending through the coaxial aperture into the opening against the module;

a pair of Belleville springs carried inside the cylindrically-shaped fitting and disposed adjacent the piston for exerting a snubbing force on the module; and means abutting the exerting means and having a surface mechanically cooperating with the exerting means for selectively fixing the degree of extension of the extending means and magnitude of the snubbing force by the exerting means against the module, the cylindrically-shaped fitting is provided with a threaded internal bore sized to reciprocally pass the disk-shaped portion and the selectively fixing means is a closure disk provided with circumferentially disposed threads shaped to mate with the threads provided in the internal bore to allow the selective fixing of the degree of extension of the extending means and the magnitude of force by the snubbing means.

7. An apparatus according to claim 6 in which there is provided a plurality of the snubbers orthogonally disposed about each module for securing each module in the cabinet.

8. An apparatus according to claim 1 in which there is provided a plurality of the snubbers orthogonally disposed about each module for securing each module in the cabinet.

9. An apparatus according to claim claims 3, 4 or 5 in which there is provided a plurality of the snubbers orthogonally disposed about each module for securing each module in the cabinet.

10. An apparatus according to claims 3, 4 or 5 in which the force distributing means is a flat strap mounted on the wall of the cabinet within the opening.

* * * * *